(12) United States Patent
Perry et al.

(10) Patent No.: US 11,177,543 B2
(45) Date of Patent: Nov. 16, 2021

(54) BATTERY INSTALLATION WITH SECURITY SCREWS FOR THEFT DETERRENCE IN CELL SITE SHELTERS AND THE LIKE

(71) Applicant: ETAK Systems, LLC, Huntersville, NC (US)

(72) Inventors: James Perry, Princeton, MA (US); Joe Hummer, Nashua, NH (US); Ross Erickson, Charlotte, NC (US); Lee Priest, Charlotte, NC (US); Jeremiah Sauriol, Aurora, IL (US); Anthony Gentile, Milford, PA (US); Steve Arneman, Matamoras, PA (US); George Praschil, Milford, PA (US)

(73) Assignee: ETAK Systems, LLC, Huntersville, NC (US)

( * ) Notice: Subject to any disclaimer, the term of this patent is extended or adjusted under 35 U.S.C. 154(b) by 223 days.

(21) Appl. No.: 15/628,070

(22) Filed: Jun. 20, 2017

(65) Prior Publication Data

US 2018/0034036 A1 Feb. 1, 2018

Related U.S. Application Data

(63) Continuation-in-part of application No. 15/221,866, filed on Jul. 28, 2016.

(51) Int. Cl.
*H01M 2/34* (2006.01)
*H01M 2/10* (2006.01)
*H01M 50/576* (2021.01)
*H01M 50/20* (2021.01)

(52) U.S. Cl.
CPC ......... *H01M 50/576* (2021.01); *H01M 50/20* (2021.01); *H01M 2220/10* (2013.01)

(58) Field of Classification Search
CPC .................................................. H01M 2/1077
See application file for complete search history.

(56) References Cited

U.S. PATENT DOCUMENTS

| 4,027,572 | A | * | 6/1977 | Burge | B25B 13/485 411/436 |
|---|---|---|---|---|---|
| 4,120,411 | A | * | 10/1978 | Johnson | B62B 3/10 104/235 |
| 4,805,404 | A | * | 2/1989 | Dupin | B25B 21/00 60/409 |
| 2005/0281002 | A1 | * | 12/2005 | Miller | H01M 2/1077 361/716 |
| 2012/0117785 | A1 | * | 5/2012 | Conrardy | H01M 50/20 29/525.02 |
| 2013/0252046 | A1 | * | 9/2013 | Zhao | H01M 2/1077 429/90 |
| 2016/0240833 | A1 | * | 8/2016 | Yang | B60L 50/64 |

FOREIGN PATENT DOCUMENTS

WO WO-2015054844 A1 * 4/2015 ............ H01M 10/48

* cited by examiner

*Primary Examiner* — Stephan J Essex
(74) *Attorney, Agent, or Firm* — Clements Bernard Baratta; Lawrence A. Baratta, Jr.; Jacob P. Beers (57) ABSTRACT

A battery installation method in a shelter or cabinet includes placing one or more batteries in the shelter or cabinet; connecting terminals on each of the one or more batteries to associated terminal plates with associated security screws; and connecting a bracket to a housing in the shelter or cabinet with associated security screws, wherein the bracket spans across the one or more batteries.

14 Claims, 9 Drawing Sheets

BATTERY INSTALLATION WITH SECURITY SCREWS FOR THEFT DETERRENCE IN CELL SITE SHELTERS AND THE LIKE

CROSS-REFERENCE TO RELATED APPLICATION(S)

The present patent/application is a continuation-in-part of the following patents/applications, each of which is incorporated by reference in full:

| Filing Date | Ser. No. | Title |
|---|---|---|
| Jul. 28, 2016 | 15/221,866 | BATTERY INSTALLATION IMPROVEMENT APPARATUS AND METHOD IN CELL SITE SHELTERS AND THE LIKE |

FIELD OF THE DISCLOSURE

The present disclosure generally relates to battery installation systems and methods. More particularly, the present disclosure relates to battery installation with security screws for theft deterrence in cell site shelters and the like.

BACKGROUND OF THE DISCLOSURE

Due to the geographic coverage nature of wireless service, there are hundreds of thousands of cell towers in the United States. With over 200,000 cell sites in the U.S., geographically distributed everywhere, installation and maintenance at cell sites can be expensive, time-consuming, and complex. For example, cell sites include a shelter or cabinet located proximate to the cell tower. For network availability, the shelter or cabinet include a battery backup for power redundancy when a primary power source is unavailable, such as commercial power. For example, depending on configuration, the battery backup may include 4, 8, 16, 48, etc. batteries which each can weigh several hundred pounds. The installation/removal process such batteries is labor intensive and slow. It would be advantageous to provide a battery installation improvement apparatus and method in cell site shelters and the like to address the labor intensity and speed.

Currently, operators are dealing with high battery theft rates. Former technicians, employees, and subcontractors with known site access information makes removal of batteries an easy target as in many cases no forced entry is required, in addition to third parties who simply break in. Batteries are sold to smelters and recyclers for lead content and can return a high dollar amount as the total number of batteries and weight is increased.

BRIEF SUMMARY OF THE DISCLOSURE

In an exemplary embodiment, a battery installation method in a shelter or cabinet includes placing one or more batteries in the shelter or cabinet; connecting terminals on each of the one or more batteries to associated terminal plates with associated security screws; and connecting a bracket to a housing in the shelter or cabinet with associated security screws, wherein the bracket spans across the one or more batteries. The security screws can be installed with a unique tool specially designed for the associated security screws to deter tampering. The security screws can include spanner screws, one-way screws, or tamper-resistant Allen-head screws each with a protruding pin. The security screws can include uniquely designed screw heads with a corresponding unique tool.

The placing can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system. The battery installation method can further include moving the battery installation apparatus into the shelter or cabinet to the location; removing old batteries from the battery system and placing the old batteries on the shelves; moving the battery installation apparatus out of the shelter or cabinet; and removing the old batteries.

In an exemplary embodiment, a battery installation method in a shelter or cabinet includes placing a plurality of batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the plurality of batteries from the shelves to the battery system. The battery installation method can further include, prior to the placing: moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The plurality of batteries can include N batteries, N=4, 8, 16, 24, or 48. The method can be performed by a single installer. The shelter or cabinet can be at a cell site.

In another exemplary embodiment, a battery installation apparatus for installing and removing batteries in a shelter or cabinet includes a frame comprising four posts, wherein the frame is dimensioned to maneuver in the shelter or cabinet; a lower shelf fixed to the frame; an upper shelf moveable on the frame, wherein each of the lower shelf and the upper shelf are dimensioned to support the batteries; and omnidirectional wheels disposed to each of the four posts.

To install the batteries, a plurality of batteries are placed on the lower shelf and the upper shelf; the frame is moved into the shelter or cabinet to a location proximate and adjacent to a battery system in the shelter or cabinet; the upper shelf is adjusted based on the battery system; and each of the plurality of batteries is moved to the battery system. To remove the batteries, the frame is moved into the shelter or cabinet to a location proximate and adjacent to a battery system in the shelter or cabinet; old batteries from the battery system are placed on the upper shelf and the lower shelf; the frame is moved out of the shelter or cabinet; and the old batteries are removed.

The frame can be dimensioned based on a size of the battery system and a size of the shelter or cabinet. The battery installation apparatus can further include a pulley system coupled to the four posts to vertically raise and lower a shelf of the shelves. The pulley system can include a handle which is rotated to move the upper shelf and which holds the upper shelf when the handle is stationary. The installation apparatus can include a rectangular shape. The plurality of batteries can include N batteries, N=4, 8, 16, 24, or 48. The battery installation apparatus can be operated by a single installer. The shelter or cabinet can be at a cell site.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a flowchart of a battery installation method with security screws for theft deterrence in cell site shelters and the like.

DETAILED DESCRIPTION OF THE DISCLOSURE

In various exemplary embodiments, the present disclosure relates to a battery installation with security screws for theft deterrence in cell site shelters and the like. Specifically, the battery installation utilizes security screws in various configurations for anchoring and securing batteries on site, such as at a cell site. Further, a method of installation is also described. The security screws require a specialized bit or tool for locking and tightening. Batteries can be anchored to terminal plates with the security screws. Further, the batteries can be locked together with one another forming a single unit, increasing the weight and bulk of the single unit presenting significant challenges to remove the batteries. Even further, brackets can be used with the security screws to attach the batteries to a shelf, cabinet, etc.

Also, in various exemplary embodiments, the present disclosure relates to a battery installation improvement apparatus and method in cell site shelters and the like. The apparatus includes an adjustable rack dimensioned to fit into small telecom cabinets or shelters and used to remove old batteries and install new batteries quickly (i.e., multiple batteries at a time) and efficiently (i.e., less labor required). The adjustable rack includes omnidirectional wheels and can be maneuvered/positioned in the shelter adjacent to a battery system. The adjustable rack includes adjustable shelves which can be positioned adjacent to old batteries for removal thereof, the apparatus can be wheeled out of the shelter to remove the old batteries, new batteries can be placed on the adjustable shelves, which can be positioned at appropriate heights based on the removal, and the apparatus can be maneuvered/positioned back to the battery system where the new batteries are provided. Advantageously, the apparatus can be used by a single installer, more than doubling the efficiency in removing/installing batteries. Also, in an exemplary embodiment, the apparatus can be used in conjunction with the security screws and installation approach.

§ 1.0 Exemplary Cell Site

Figure 1:
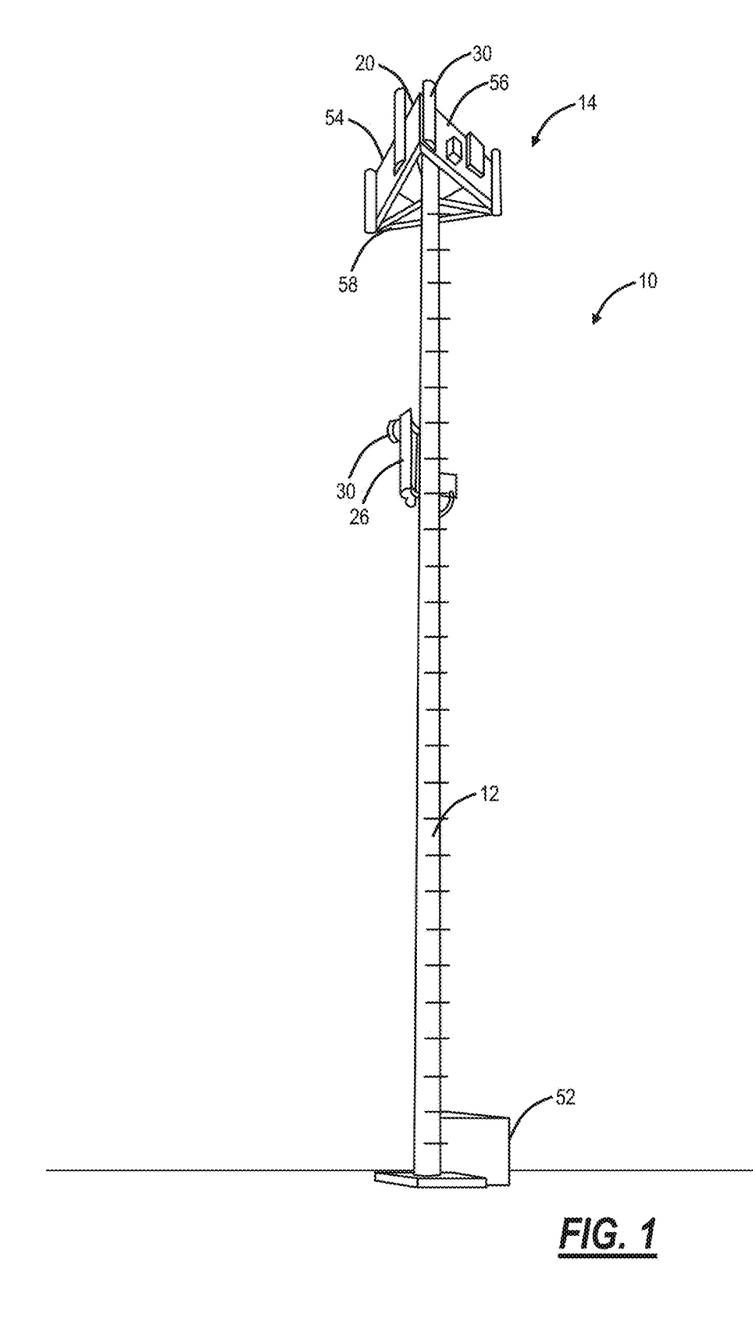
FIG. 1 is a diagram of an exemplary cell site.

Referring to FIG. 1, in an exemplary embodiment, a diagram illustrates a side view of an exemplary cell site 10. The cell site 10 includes a cell tower 12. The cell tower 12 can be any type of elevated structure, such as 100-200 feet/30-60 meters tall. Generally, the cell tower 12 is an elevated structure for holding cell site components 14. The cell tower 12 may also include a lighting rod 16, a warning light 18, etc. Of course, there may various additional components associated with the cell tower 12 and the cell site 10 which are omitted for illustration purposes. In this exemplary embodiment, there are four sets 20, 22, 24, 26 of cell site components 14, such as for four different wireless service providers. In this example, the sets 20, 22, 24 include various antennas 30 for cellular service. The sets 20, 22, 24 are deployed in sectors, e.g. there can be three sectors for the cell site components—alpha, beta, and gamma. The antennas 30 are used to both transmit a radio signal to a mobile device and receive the signal from the mobile device. The antennas 30 are usually deployed as a single, groups of two, three or even four per sector. The higher the frequency of spectrum supported by the antenna 30, the shorter the antenna 30. For example, the antennas 30 may operate around 850 MHz, 1.9 GHz, and the like. The set 26 includes a microwave dish 32 which can be used to provide other types of wireless connectivity, besides cellular service. There may be other embodiments where the cell tower 12 is omitted and replaced with other types of elevated structures such as roofs, water tanks, etc.

To support the various cell site components and their operation thereof, the cell site 10 includes a shelter 50 (which can also be referred to as a cabinet, house, etc.) which include electronics and other networking equipment to support the functionality and operation. The shelter 50 can include a battery system which supports power for the various equipment at the cell site 10 when a primary power source is unavailable. The present disclosure relates to an apparatus and method for improving installation efficiency of individual batteries in the battery system. The apparatus and method are illustrated herein referencing the cell site 10 and the shelter 50, but those of ordinary skill in the art will recognize other applications are also contemplated in the telecom and data communications space.

§ 2.0 Exemplary Shelter

Figure 2:
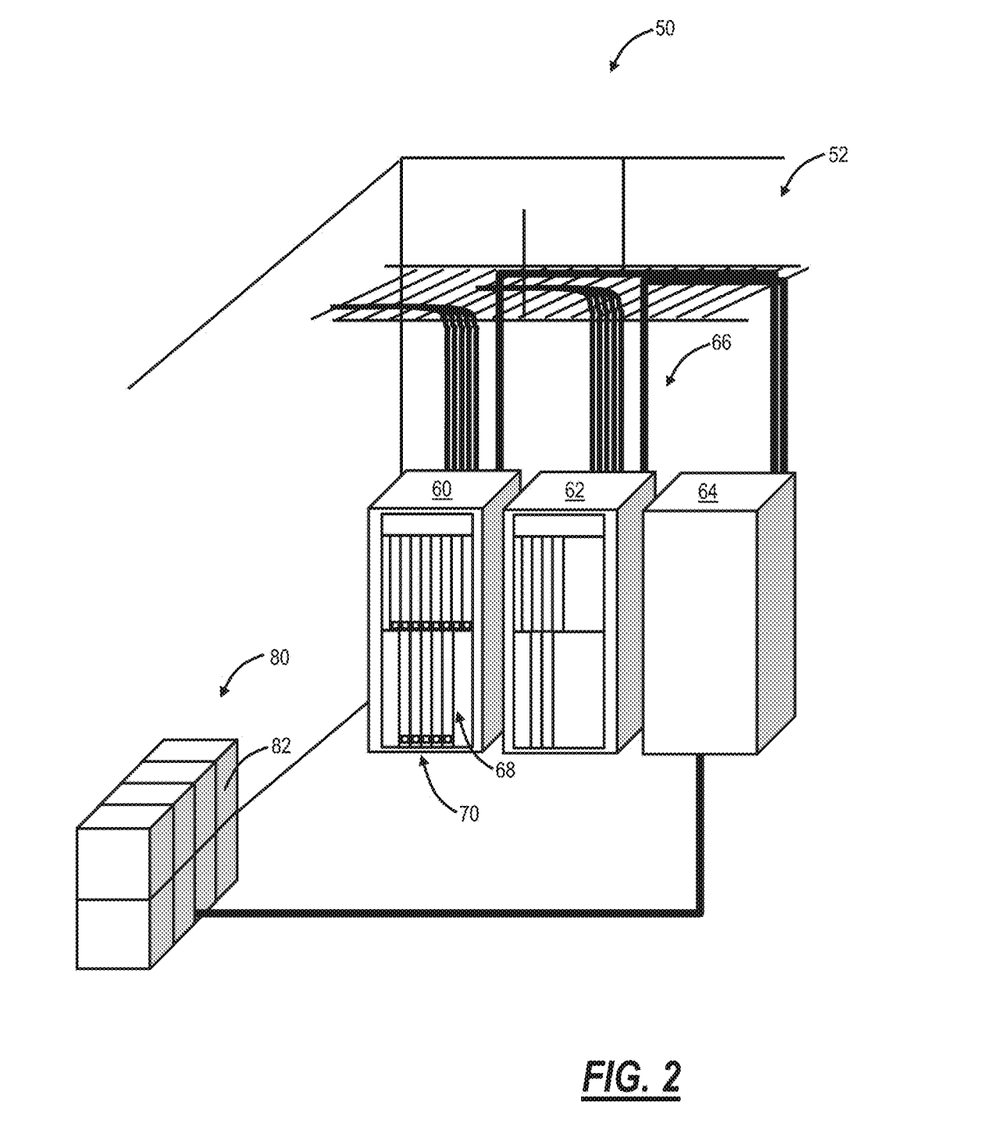
FIG. 2 is a diagram of an exemplary interior of a shelter at the cell site.

Referring to FIG. 2, in an exemplary embodiment, a diagram illustrates an exemplary interior 52 of a shelter 50 at the cell site 10. Generally, the shelter 50 houses equipment associated with the cell site 10 such as wireless RF terminals 60 (e.g., LTE terminals), wireless backhaul equipment 62, power distribution 64, and the like. Generally, wireless RF terminals 60 connect to the cell site components 14 for providing associated wireless service. The wireless backhaul equipment 62 includes networking equipment to bring the associated wireless service signals to a wireline network, such as via fiber optics or the like. The power distribution 64 provides power for all of the equipment such as from the grid as well as a battery backup to enable operation in the event of power failures. Of course, additional equipment and functionality are contemplated in the interior 52. The terminals 60, equipment 62, and the power distribution 64 can be realized as rack or frame mounted hardware with cabling 66 and with associated modules 68. The modules 68 can be pluggable modules which are selectively inserted in the hardware and each can include unique identifiers 70 such as barcodes, Quick Response (QR) codes, RF Identification (RFID), physical labeling, color coding, or the like. Each module 918 can be unique with a serial number, part number, and/or functional identifier. The modules 68 are configured as needed to provide the associated functionality of the cell site.

The power distribution 64 can receive power from a primary source which is typically a local power provider. To support resiliency and redundancy when the primary source is unavailable, e.g., during a power outage, the shelter 50 can include a battery system 80 which can also be coupled to the power distribution 64. The present disclosure relates to an apparatus which is maneuverable in the shelter 50 to remove/install batteries in the battery system 80.

§ 3.0 Battery System for a Shelter or the Like

Figure 3:
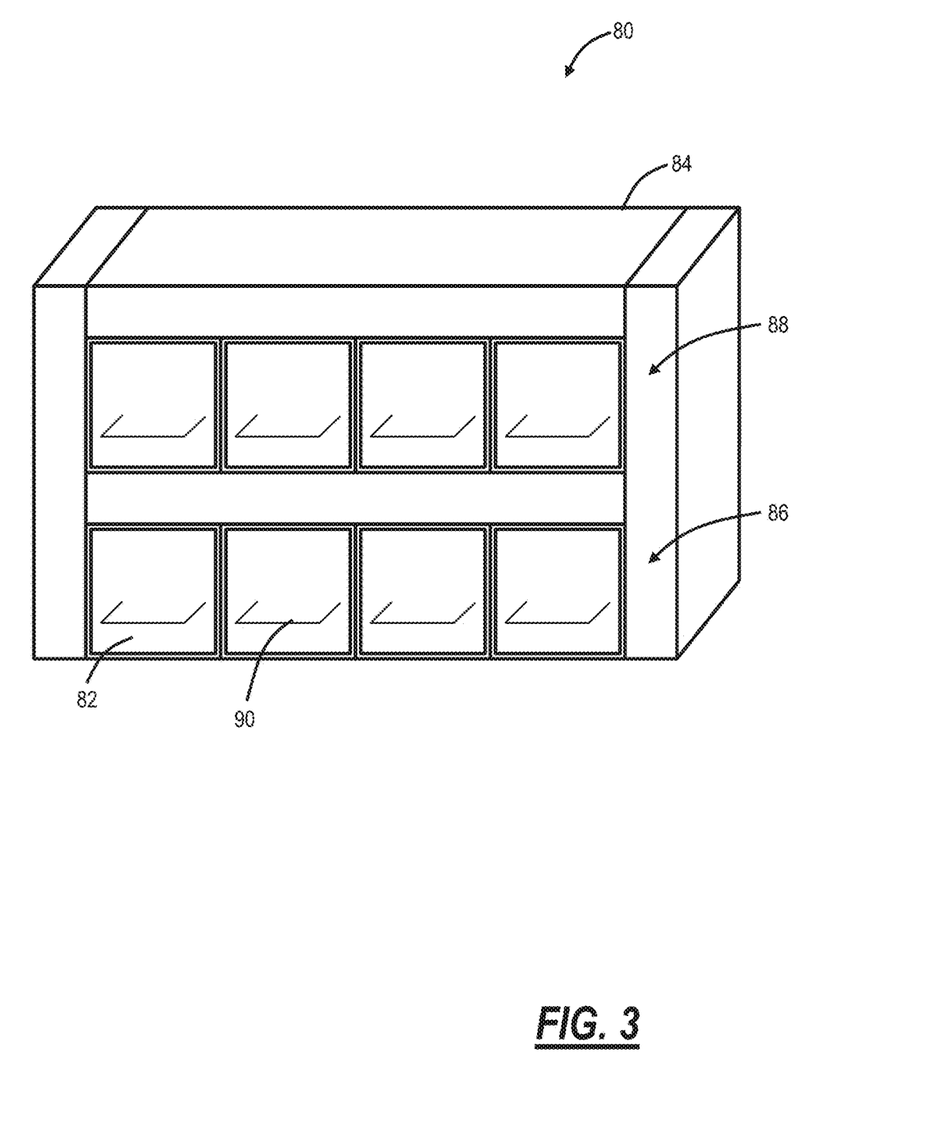
FIG. 3 is a block diagram of an exemplary battery system.

Referring to FIG. 3, in an exemplary embodiment, a block diagram illustrates an exemplary battery system 80. The battery system 80 can include N batteries 82, N being an integer such as 4, 8, 16, 48, etc. (N=8 in the example of FIG. 3). The number of batteries 82 is selected based on the amount of equipment associated with the cell site 10 and the amount of backup time desired. Typically, the number of batteries is 4 or more. The battery system 80 can include a housing 84, such as a frame, rack, etc. with openings for each of the batteries 82. For example, the housing 84 can have a rectangular shape with rows 86, 88 of the batteries 82 at various heights. The example of FIG. 3 includes two rows 86, 88, but other embodiments are also contemplated such as a single row, more than two rows, etc.

The batteries 82 can be selectively plugged/unplugged into the housing 84 of the battery system 80. The housing 84 supports connectivity between the batteries 82 and to the power distribution 64 as well as monitoring of the batteries 82. In other embodiments, the battery system 80 can omit the housing 84 where the batteries 82 are directly connected to one another and supported, for example, by shelves or simply placed on the ground and on top of one another. The batteries 82 can include a handle 90 or the like for an installer to handle physically.

§ 4.0 Battery Installation Apparatus

Figure 4:
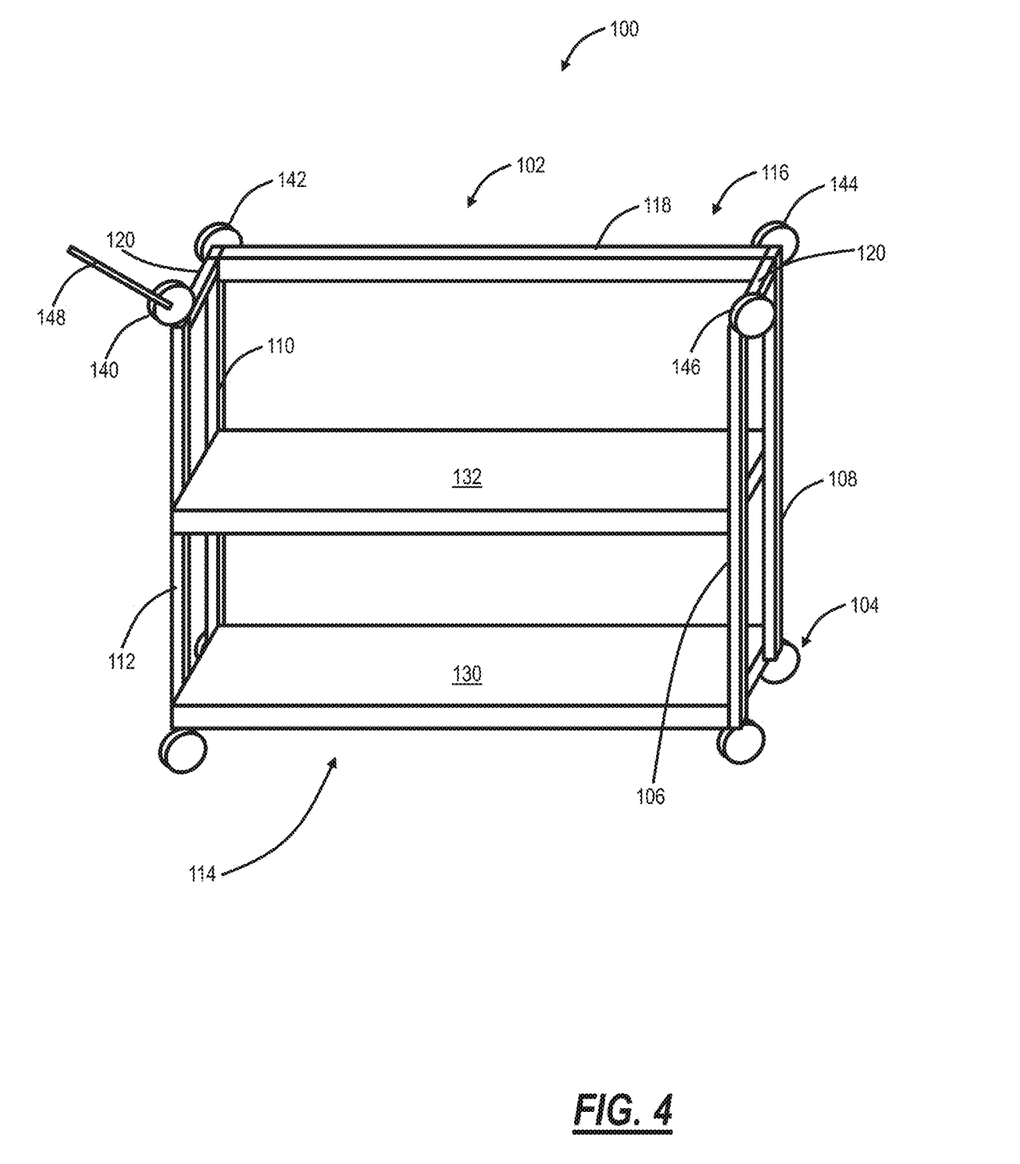
FIG. 4 is a diagram of a battery installation apparatus for assisting in the removal and installation of the batteries in the shelter.

Referring to FIG. 4, in an exemplary embodiment, a diagram illustrates a battery installation apparatus 100 for assisting in the removal and installation of the batteries 82 in the shelter 50. The battery installation apparatus 100 is a maneuverable frame 102 with omnidirectional wheels 104. Specifically, the frame 102 can include four vertical support posts 106, 108, 110, 112 each connected to one of the omnidirectional wheels 104. The shape of the frame 102 is generally rectangular, similar to the battery system 80. A front side 114 of the frame is open, and a rear side 116 includes support bars 118 connected between the posts 108, 110. The sides of the frame 102 include support bars 120 between the posts 110, 112 and the posts 106, 108.

The apparatus 100 can include a fixed bottom shelf 130 connected or disposed to the posts 106, 108, 110, 112. The apparatus 100 can also include a moveable shelf 132. The moveable shelf 132 is adjustable based on four pulleys 140, 142, 144, 146. The pulley 140 includes a handle 148 that is adapted to rotate to move a rope or other winch type mechanism which is connected to the other pulleys 142, 144, 146 as well. Movement of the handle 148 causes the moveable shelf 132 to move vertically evenly in either direction (based on the rotation direction of the handle 148). When the handle 148 is stationary, the moveable shelf 132 remains fixed in place.

The shelves 130, 132 are configured to support the batteries 82. Specifically, the apparatus 100 is dimensioned to support the N batteries 82, sort of like a mobile battery system 80. The moveable shelf 132 is vertically adjusted to match the height of the second row of the batteries 82 in the battery system 80.

In an exemplary embodiment, a battery installation apparatus for installing and removing batteries in a shelter or cabinet includes a frame comprising four posts, wherein the frame is dimensioned to maneuver in the shelter or cabinet; a lower shelf fixed to the frame; an upper shelf moveable on the frame, wherein each of the lower shelf and the upper shelf are dimensioned to support the batteries; and omnidirectional wheels disposed to each of the four posts.

To install the batteries, a plurality of batteries are placed on the lower shelf and the upper shelf; the frame is moved into the shelter or cabinet to a location proximate and adjacent to a battery system in the shelter or cabinet; the upper shelf is adjusted based on the battery system; and each of the plurality of batteries is moved to the battery system. To remove the batteries, the frame is moved into the shelter or cabinet to a location proximate and adjacent to a battery system in the shelter or cabinet; old batteries from the battery system are placed on the upper shelf and the lower shelf; the frame is moved out of the shelter or cabinet; and the old batteries are removed.

The frame can be dimensioned based on a size of the battery system and a size of the shelter or cabinet. The battery installation apparatus can further include a pulley system coupled to the four posts to vertically raise and lower a shelf of the shelves. The pulley system can include a handle which is rotated to move the upper shelf and which holds the upper shelf when the handle is stationary. The battery installation apparatus can include a rectangular shape. The plurality of batteries can include N batteries, N=4, 8, 16, 24, or 48. The battery installation apparatus can be operated by a single installer. The shelter or cabinet can be at a cell site.

§ 5.0 Battery Installation Method

Figure 5:
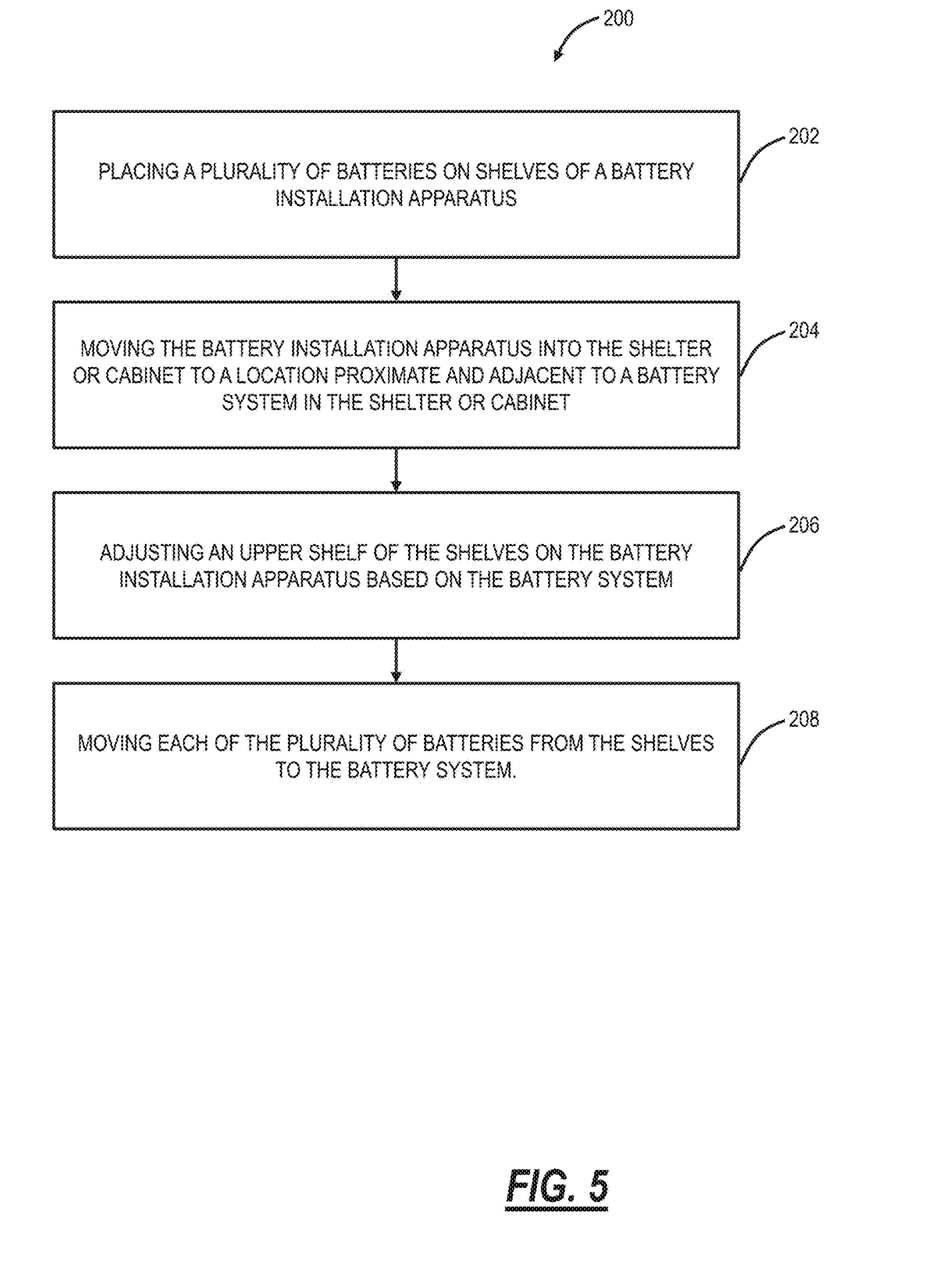
FIG. 5 is a flowchart of a battery installation method for assisting in the removal and installation of the batteries in the shelter using the battery installation apparatus.

Referring to FIG. 5, in an exemplary embodiment, a flowchart illustrates a battery installation method 200 for assisting in the removal and installation of the batteries 82 in the shelter 50 using the battery installation apparatus 100. The battery installation method 200 includes placing a plurality of batteries on shelves of a battery installation apparatus (step 202); moving the battery installation apparatus into the shelter or cabinet to a location proximate and adjacent to a battery system in the shelter or cabinet (step 204); adjusting an upper shelf of the shelves on the battery installation apparatus based on the battery system (step 206); and moving each of the plurality of batteries from the shelves to the battery system (step 208). The battery installation method can further include, prior to step 202, moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The plurality of batteries can include N batteries, N=4, 8, 16, 24, or 48. The method 200 can be performed by a single installer. The shelter or cabinet can be at a cell site.

§ 6.0 Security Screws for Battery Installation

Figure 6:
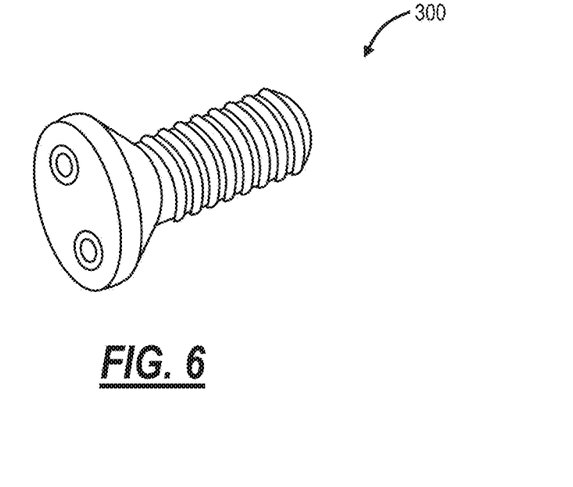
FIG. 6 is a diagram of an example of a security screw.

Referring to FIG. 6, in an exemplary embodiment, a diagram illustrates an example of a security screw 300. As described herein, the security screw 300 and other security screws have unique designs that make them virtually impossible to remove without specialized tools. The security screws can be referred to as tamper proof, tamper resistant, etc. The systems and methods described herein contemplate use of any type of security screw. Common examples of tamper resistant screws are one-way screws, spanner screws, and a tamper-resistant Allen-head screw with a protruding pin keeping regular Allen wrenches from working. A one-way screw has counter-clockwise ramps in the screw's head. A screw-driver turned clockwise engages the screw-head and forces it to rotate, but a screw-driver turned counter-clockwise slides up the ramps and accomplishes nothing. The intention is that the screws can be installed with a standard screw-driver but cannot be easily removed without a special removal tool that digs into the ramps to get a good grip.

A spanner screw has two small holes drilled in its head and is designed to be installed and removed with a special spanner screw-driver. The security screw 300 is an example of a spanner screw. A tamper-resistant Allen-head screw is designed to be removed only with a specially modified Allen wrench having a small hole drilled in its end to accept the protruding pin in the head of the screw. Also, the security screws can have unique, proprietary designs making them more tamper resistant than off-the-shelf variants such as the spanner screw. Again, the systems and methods described herein contemplate use of any type of security screw.

Figure 7:
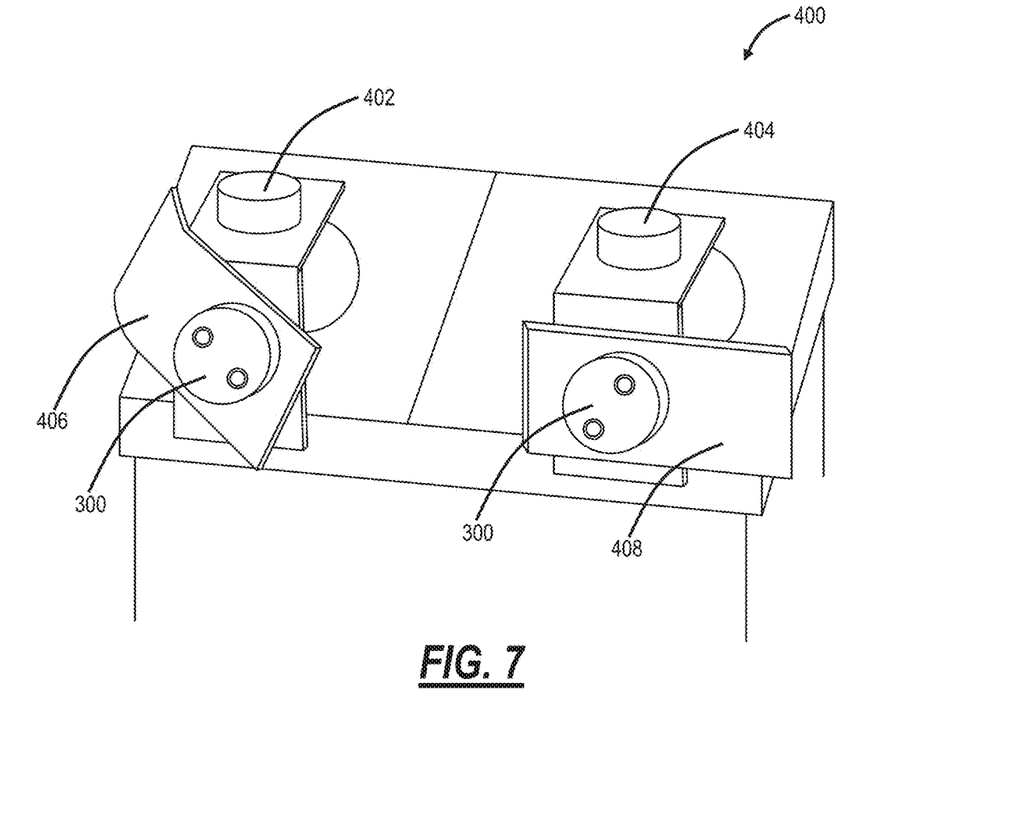
FIG. 7 is a diagram of a battery with security screws attaching terminals to terminal plates.

Referring to FIG. 7, in an exemplary embodiment, a diagram illustrates a battery 400 with security screws 300 attaching terminals 402, 404 to terminal plates 406, 408. The battery 400 can be square or rectangular shaped and the battery 400 can be positioned and installed with the battery installation apparatus 100. The battery 400 includes terminals 402, 404 (e.g., a positive and a negative terminal) which need to be connected to corresponding leads (not shown) to connect the battery 400. Note, the battery 400 can be connected in various ways (e.g., series, parallel, etc.) with other batteries. The terminals 402, 404 are connected to terminal plates 406, 408 respectively and the terminal plates 406, 408 are ultimately connected to the leads. This connection is both a physical connection, locking the battery 400 in place, and an electrical connection.

In the systems and methods, the terminals 402, 404 are physically connected to the terminal plates 406, 408 using the security screws 300 (or any variant of a security, tamper proof, or tamper resistant screw). The security screws 300 are used in lieu of conventional screws. On-site installation personnel are equipped with an associated unique tool to fasten and tighten the security screws 300 physically connecting the terminals 402, 404 with the terminal plates 406, 408. Note, the terminal plates 406, 408 can also be connected at an opposite end via the security screws 300. The security screws 300 have minimal increased cost from conventional screws and add little to no additional installation time. At the same time, the security screws 300 advantageously lock the battery 400 in place, minimizing the risk of theft. That is, once installed, the battery 400 is physically locked and cannot be undone without the unique tool.

Also, paint can be applied over the security screw 300, the terminals 402, 404, and the terminal plates 406, 408 after the security screw 300 is tightened. The paint is for quality control, to show that the steps have been taken to appropriately tighten the security screw 300 (to the specified torque)—assumption is made that if someone takes the trouble to apply the paint, they have appropriately tightened the screw. And, if the paint is applied and dries in place on a tightened security screw 300 and then is found to be broken, the security screw 300 is no longer tight—an easy visual confirmation of appropriately tightened connections.

Figure 8:
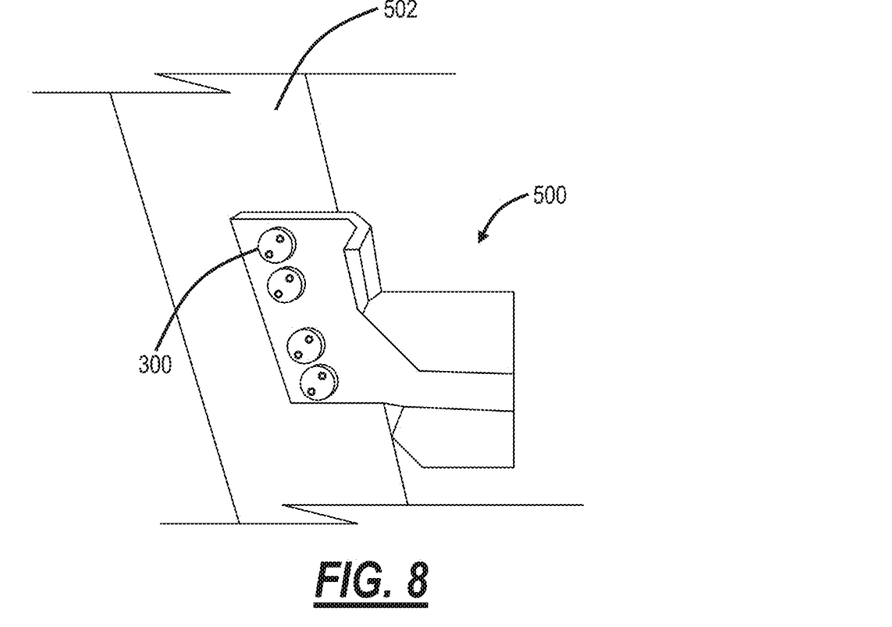
FIGS. 8 and 9 are diagrams of a bracket fastened to a housing via the security screws.
Figure 9:
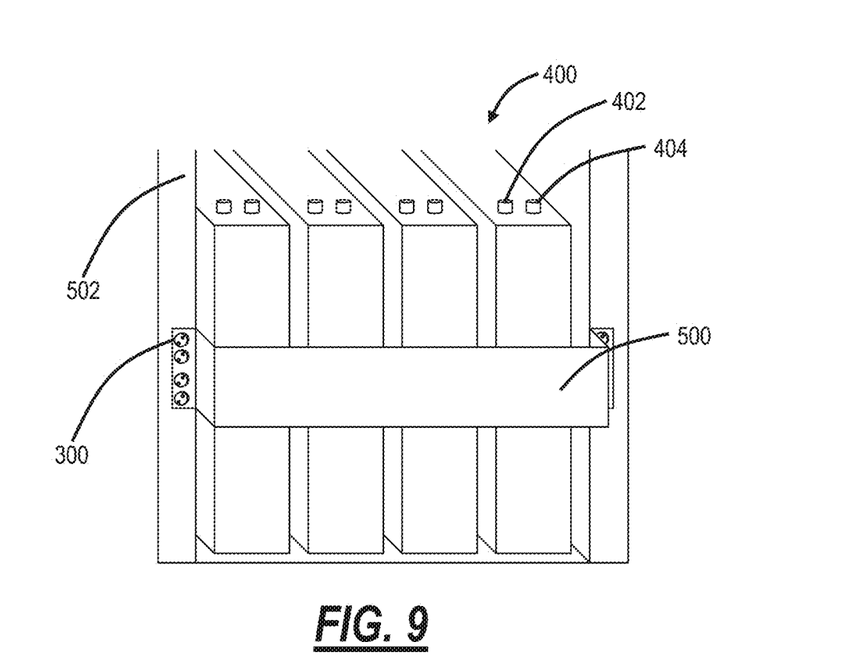
Figure 10:
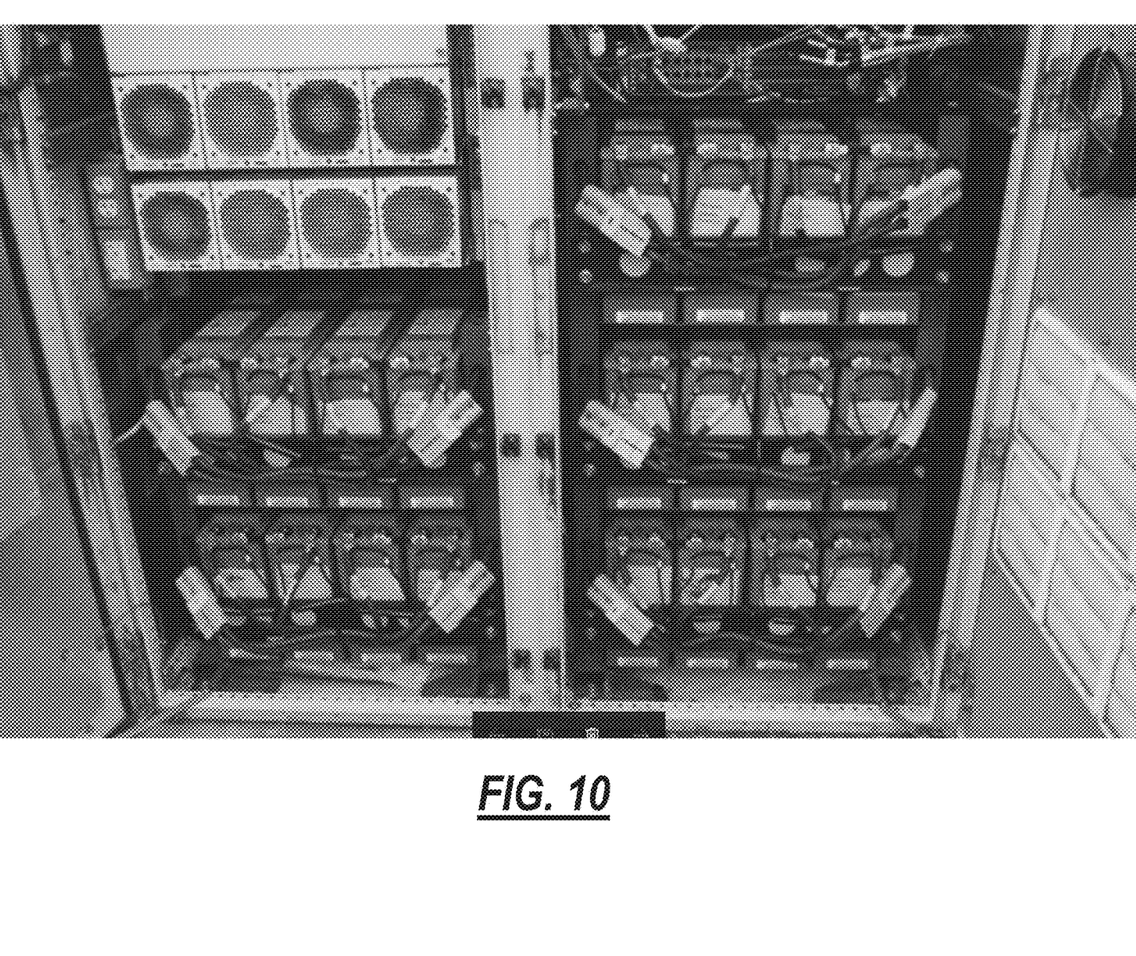
FIG. 10 is a diagram of batteries installed in an outside plant cabinet.

Referring to FIGS. 8 and 9, in an exemplary embodiment, diagrams illustrate a bracket 500 fastened to a housing 502 via the security screws 300. The bracket 500 can be used in conjunction with the security screws 300 between the terminals 402, 404 and the terminal plates 406, 408. The bracket 500 locks the batteries 400 together to a structure, i.e., the housing 502. For example, the housing 502 can be part of a cabinet or the like. FIG. 10 illustrates the batteries 400 installed in an outside plant cabinet. The bracket 500 locks the batteries 400 together as a single unit and provides protection from removal. The bracket 500 can also hold the batteries 400 in place.

Figure 11:
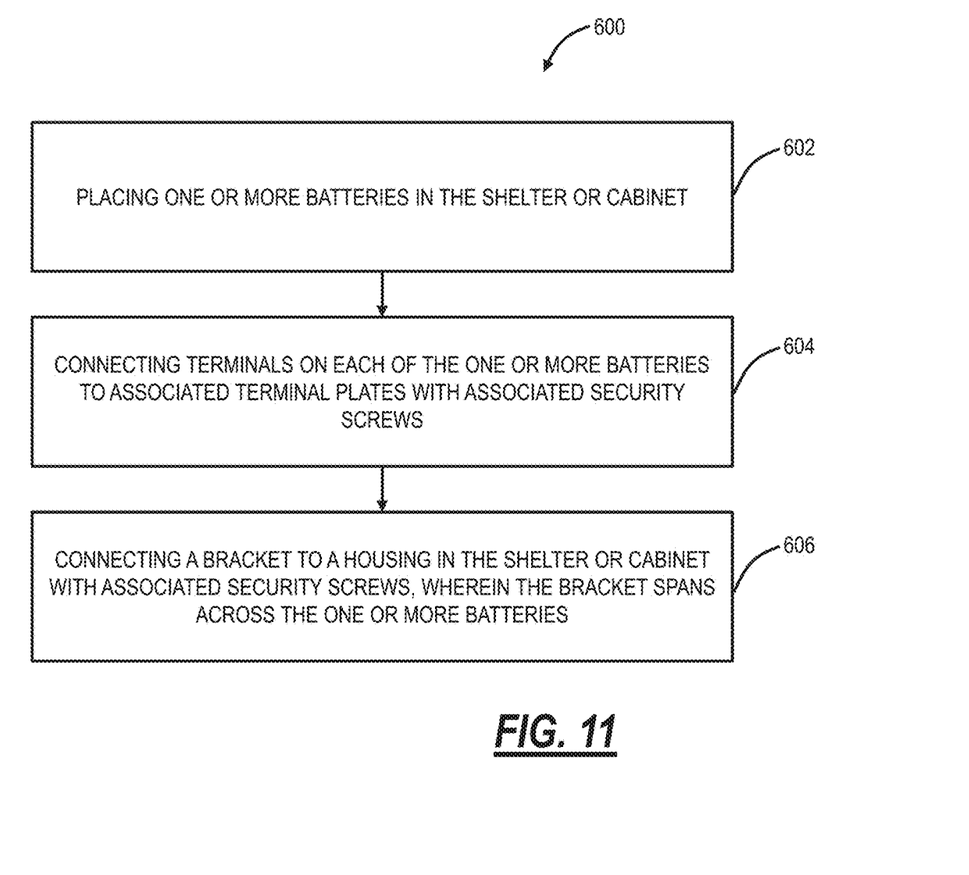

Referring to FIG. 11, in an exemplary embodiment, a flowchart illustrates a battery installation method 600 with security screws for theft deterrence in cell site shelters and the like. The battery installation method 600 includes placing one or more batteries in the shelter or cabinet (step 602); connecting terminals on each of the one or more batteries to associated terminal plates with associated security screws (step 604); and connecting a bracket to a housing in the shelter or cabinet with associated security screws, wherein the bracket spans across the one or more batteries (step 606). The security screws are installed with a unique tool specially designed for the associated security screws to deter tampering. The security screws can include spanner screws, one-way screws, or tamper-resistant Allen-head screws each with a protruding pin. The security screws can include uniquely designed screw heads with a corresponding unique tool.

The placing step 602 can include placing the one or more batteries on shelves of a battery installation apparatus; moving the battery installation apparatus into the shelter or cabinet to a location proximate and adjacent to a battery system in the shelter or cabinet; adjusting an upper shelf of the shelves on the battery installation apparatus based on the battery system; and moving each of the one or more batteries from the shelves to the battery system. The battery installation method 600 can further include moving the battery installation apparatus into the shelter or cabinet to the location; removing old batteries from the battery system and placing the old batteries on the shelves; moving the battery installation apparatus out of the shelter or cabinet; and removing the old batteries.

The battery installation apparatus can be dimensioned based on a size of the battery system and a size of the shelter or cabinet. The battery installation apparatus can include omnidirectional wheels for maneuverability. The battery installation apparatus can include a frame with posts supporting the shelves and with a pulley system to vertically raise and lower a shelf of the shelves. The battery installation apparatus can include a rectangular shape with a lower shelf fixed to a frame. The moving can be through a pulley system which rotates a handle to move the upper shelf and holds the upper shelf when the handle is stationary. The one or more batteries can include N batteries, N=4, 8, 16, 24, or 48. The battery installation method 600 can be performed by a single installer. The shelter or cabinet is at a cell site.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A battery installation method in a shelter or cabinet at a cell site, the battery installation method comprising:
    placing a plurality of batteries aligned next to each other in a housing in the shelter or cabinet at the cell site;
        connecting each terminal on each of the plurality of batteries to an associated terminal plate with an associated tamper resistant security screw adapted to deter tampering therewith, wherein each terminal of the plurality of batteries is physically directly connected to the associated terminal plate using the associated tamper resistant security screw;
        providing a bracket spanning across the plurality of batteries aligned next to each other, the bracket being an elongated one-piece structure; and
        locking the plurality of batteries together as a single unit by connecting ends of the bracket to the housing in the shelter or cabinet at the cell site with associated tamper resistant security screws, such that the bracket spans across the plurality of batteries, in a first direction, holding the plurality of batteries together as the single unit and provides protection from theft thereof,
        wherein the bracket includes sides protruding outward from connections to the shelf that each extend in a second direction outward from the shelf and along a battery at an end of the single unit such that the plurality of batteries are partially bracketed by the sides of the bracket, and wherein the first direction is transverse to the second direction and spans between the sides.

2. The battery installation method of claim 1, wherein the security screws are installed with a unique tool specially designed for the associated tamper resistant security screws to deter the tampering.

3. The battery installation method of claim 1, wherein the security screws comprise spanner screws.

4. The battery installation method of claim 1, wherein the security screws comprise one of one-way screws, tamper-resistant Allen-head screws each with a protruding pin, and uniquely designed screw heads with a corresponding unique tool.

5. The battery installation method of claim 1, wherein the placing comprises
    placing the plurality of batteries on shelves of a battery installation apparatus;
    moving the battery installation apparatus into the shelter or cabinet to a location proximate and adjacent to a battery system in the shelter or cabinet;
    adjusting an upper shelf of the shelves on the battery installation apparatus based on the battery system; and
    moving each of the plurality of batteries from the shelves to the battery system.

6. The battery installation method of claim 5, further comprising:
    moving the battery installation apparatus into the shelter or cabinet to the location;
    removing old batteries from the battery system and placing the old batteries on the shelves;
    moving the battery installation apparatus out of the shelter or cabinet; and
    removing the old batteries.

7. The battery installation method of claim 5, wherein the battery installation apparatus is dimensioned based on a size of the battery system and a size of the shelter or cabinet.

8. The battery installation method of claim 5, wherein the battery installation apparatus comprises omnidirectional wheels for maneuverability.

9. The battery installation method of claim 5, wherein the battery installation apparatus comprises a frame with posts supporting the shelves and with a pulley system to vertically raise and lower a shelf of the shelves.

10. The battery installation method of claim 5, wherein the battery installation apparatus comprises a rectangular shape with a lower shelf fixed to a frame.

11. The battery installation method of claim 5, wherein the moving is through a pulley system which rotates a handle to move the upper shelf and holds the upper shelf when the handle is stationary.

12. The battery installation method of claim 5, wherein the plurality of batteries comprises N batteries, N=4, 8, 16, 24, or 48.

13. The battery installation method of claim 5, wherein the method is performed by a single installer.

14. The battery installation method of claim 1, further comprising applying paint over each security screw connecting a terminal to a terminal plate after connecting each terminal on each of the plurality of batteries to the associated terminal plate with the associated security screw.

* * * * *